United States Patent [19]

Niemeyer, III

[11] Patent Number: 4,827,293

[45] Date of Patent: May 2, 1989

[54] SYMMETRICAL BRAKING SYSTEM FOR A GRAPHIC RECORDER

[75] Inventor: Robert H. Niemeyer, III, Martinez, Calif.

[73] Assignee: AM International Corporation, Chicago, Ill.

[21] Appl. No.: 75,530

[22] Filed: Jul. 20, 1987

[51] Int. Cl.$^4$ .................. G01D 15/16; G05G 5/06; B65H 59/10; F16D 63/00

[52] U.S. Cl. .................. 346/139 R; 346/46; 346/29; 346/49; 188/67; 188/82.1; 74/531; 192/41 R

[58] Field of Search .......... 346/139 R, 29, 46, 49, 346/141; 188/67, 82.1; 74/531; 192/41 R

[56] References Cited

U.S. PATENT DOCUMENTS 3,092,227  6/1963  Dossier .................. 188/67

Primary Examiner—E. A. Goldberg
Assistant Examiner—Mark Reinhart

Attorney, Agent, or Firm—Roy A. Ekstrand; Nicholas A. Camasto

[57] ABSTRACT

A symmetrical braking system for a graphic recorder includes a generally cylindrical brake support supported by a carriage drive and having a combination of cam surfaces. A brake rotor is rotatable supported upon the brake support and defines an arrangement of captivating notches which receive a pair of brake shoes in an overlying arrangement. Bearing means are coupled to each of the brake shoes and are driven by the cam surfaces of the brake support. A coupling arrangement is secured to the brake rotor and provides a coupling for rotational forces between the brake rotor and an actuator beam extending through the brake structure. Rotational forces applied to the actuator beam are coupled to the brake rotor and the bearing means cooperate with the cam surfaces to move the brake shoes into or out of engagement with the actuator beam as a function of rotational position.

15 Claims, 5 Drawing Sheets

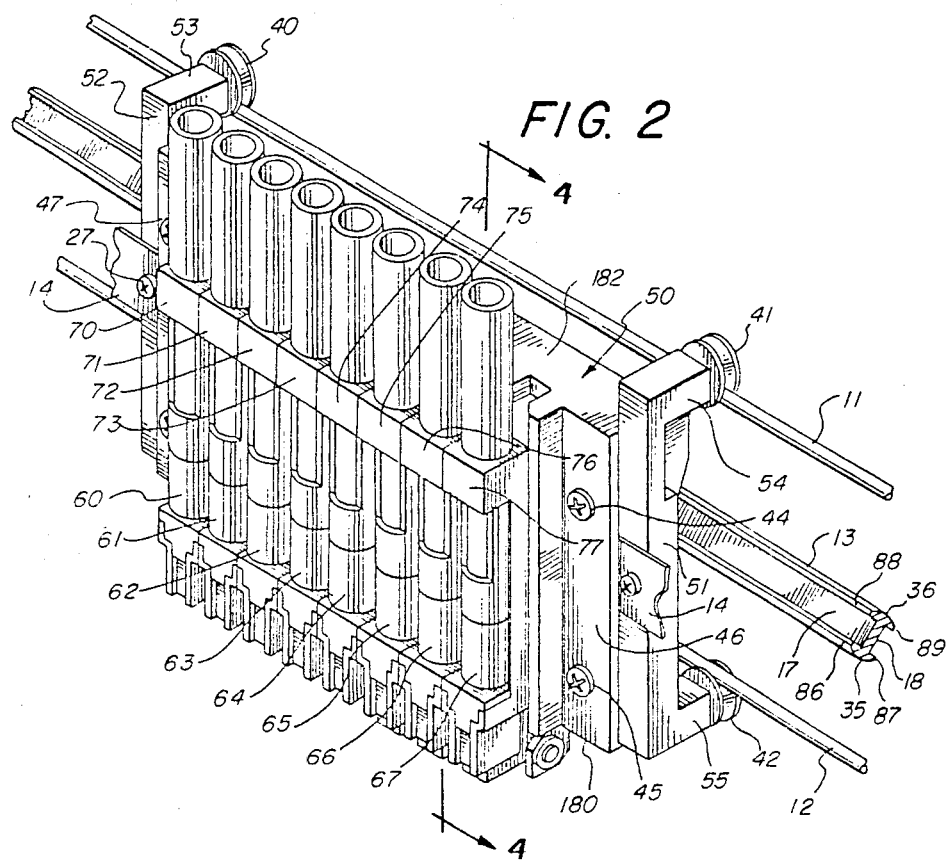
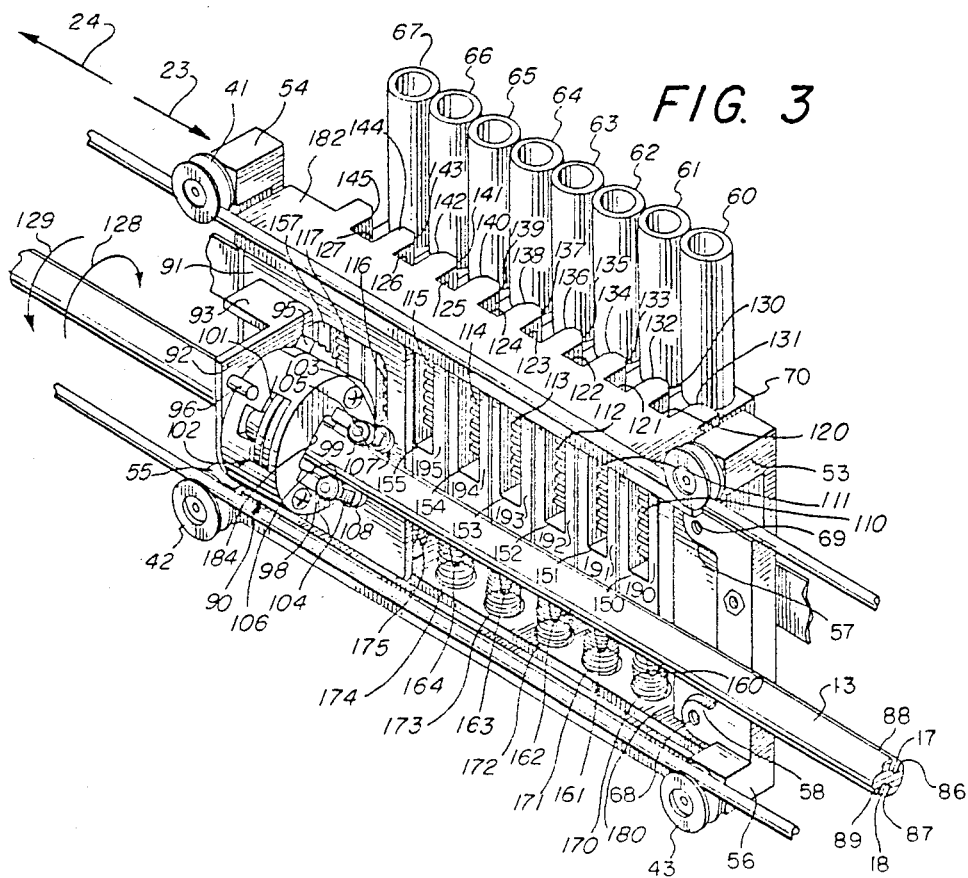

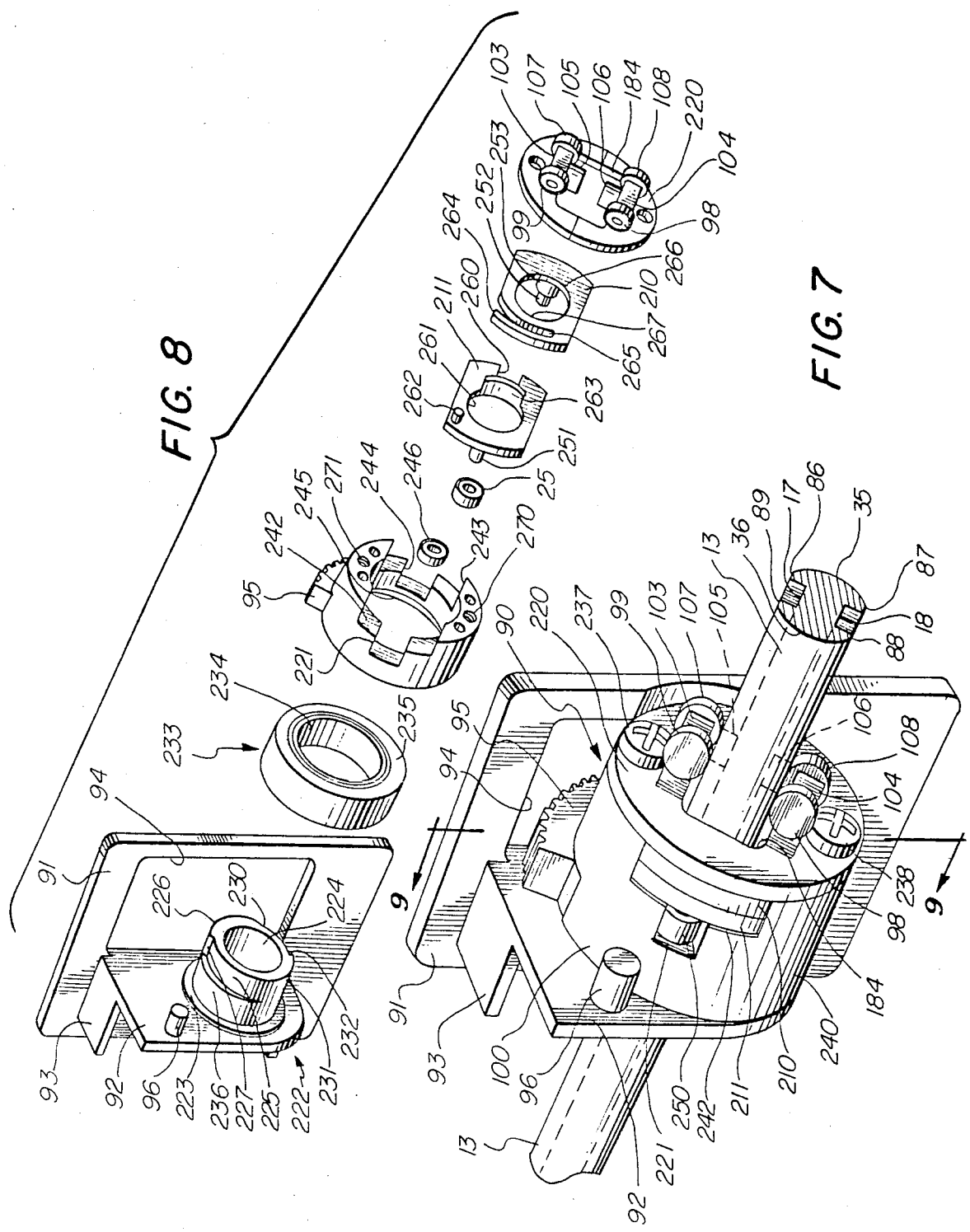

SYMMETRICAL BRAKING SYSTEM FOR A GRAPHIC RECORDER

CROSS REFERENCE TO RELATED APPLICATIONS

This application discloses apparatus described and claimed in the following related application:
ROTARY ACTION GRAPHIC RECORDING SYSTEM, filed July 20, 1987 in the name of Robert Niemeyer, Ser. No. 07/075,533.

FIELD OF THE INVENTION

This invention relates generally to graphic recording systems and particularly to those in which a plurality of recording elements are carried by a moveable carriage and in which a recording media is moved relative to the path of the carriage motion to provide a desired recording upon the media.

BACKGROUND OF THE INVENTION

A substantial number of graphic recording systems have been developed to provide automated or computer controlled graphic recording upon a media. While the individual structures of such graphic recorders vary substantially, generally all include a media transport system in which the media is moved in a first direction and a moveable pen carriage supported and controlled to provide motion of the pen carriage in a second direction relative to media motion. In most instances, the directions of media movement and pen carriage movement are orthogonal.

With the development of computer drive systems having increased capability, there arose a need to provide graphic recording systems employing a plurality of recording pens which commonly facilitated multiple color selection.

Several multiple pen graphic recording systems have been developed including that set forth in U.S. Pat. No. 3,401,401 issued Sept. 10, 1968 to Read et al for Multiple Pen Carriage which provides four pens supported on a moveable carriage together with a corresponding group of four independent actuating devices each operative upon one of the pens.

A different approach is found in U.S. Pat. No. 4,135,245 issued Jan. 16, 1979 to Kemplin et al for Plotter With Automatic Pen Changer in which a stationary pen repository holds multiple pens and a moveable recording head configured to receive and support a single recording pen together with means for interrupting the recording process in order to exchange the pen supported by the recording head from the stationary pen repository.

One of the more promising approaches to multiple pen recording is set forth in U.S. Pat. No. 4,578,683 issued Mar. 25, 1986 to Gordon and entitled Graphic Recording System which is commonly owned with the present invention in which a moveable pen carriage supports a plurality of recording elements in a linear array. The carriage is moveable in two directions along a path relative to the recording media and an associated actuator arm mechanism is moveably supported on a rod. The rod has its longitudinal axis generally parallel to the carriage path. Stationary operating means are coupled to the rod and are operative to move the selected pen into engagement with the recording media. Of particular importance is the systems avoidance of powered actuating means upon the pen carriage and its reduction of overall mass of the pen carriage.

Because the change of pens on the linear array requires movement of the pen carriage relative to the pen actuator, there remains a need in the art for a graphic recording system having a lightweight brake mechanism which avoids the need of supporting powered brake mechanisms upon the moveable carriage and provides accurate controllable pen selection and motion.

SUMMARY OF THE INVENTION

Accordingly, it is a general object of the present invention to provide an improved graphic recording system. It is a more particular object of the present invention to provide an improved symmetrical brake for use in a graphic recording system having a linear array of recording pens which avoids the need of supporting powered brake apparatus upon the moveable carriage and which simultaneously facilitates pen selection and maintains accuracy of recording pen motion.

In accordance with the present invention there is provided for use in a multiple pen graphic recording system in which a plurality of recording pens are supported by a moveable carriage and in which a rotary actuator is operable to move a selected one of the pens in the linear array into or out of contact with the media, a symmetrical bake operative to maintain the position of the rotary actuator in a fixed position during pen changes despite movement of the pen carriage.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 2 is an enlarged front perspective view of the moveable pen carriage of the Rotary Actuated Graphic Recording System set forth in FIG. 1;

FIG. 3 is a rear perspective view of the moveable pen carriage of FIG. 2;

FIG. 7 is a perspective view of the present invention symmetrical brake; and

FIG. 8 is an exploded view of the present invention symmetrical brake; and

DESCRIPTION OF THE PREFERRED EMBODIMENT

Figure 1:
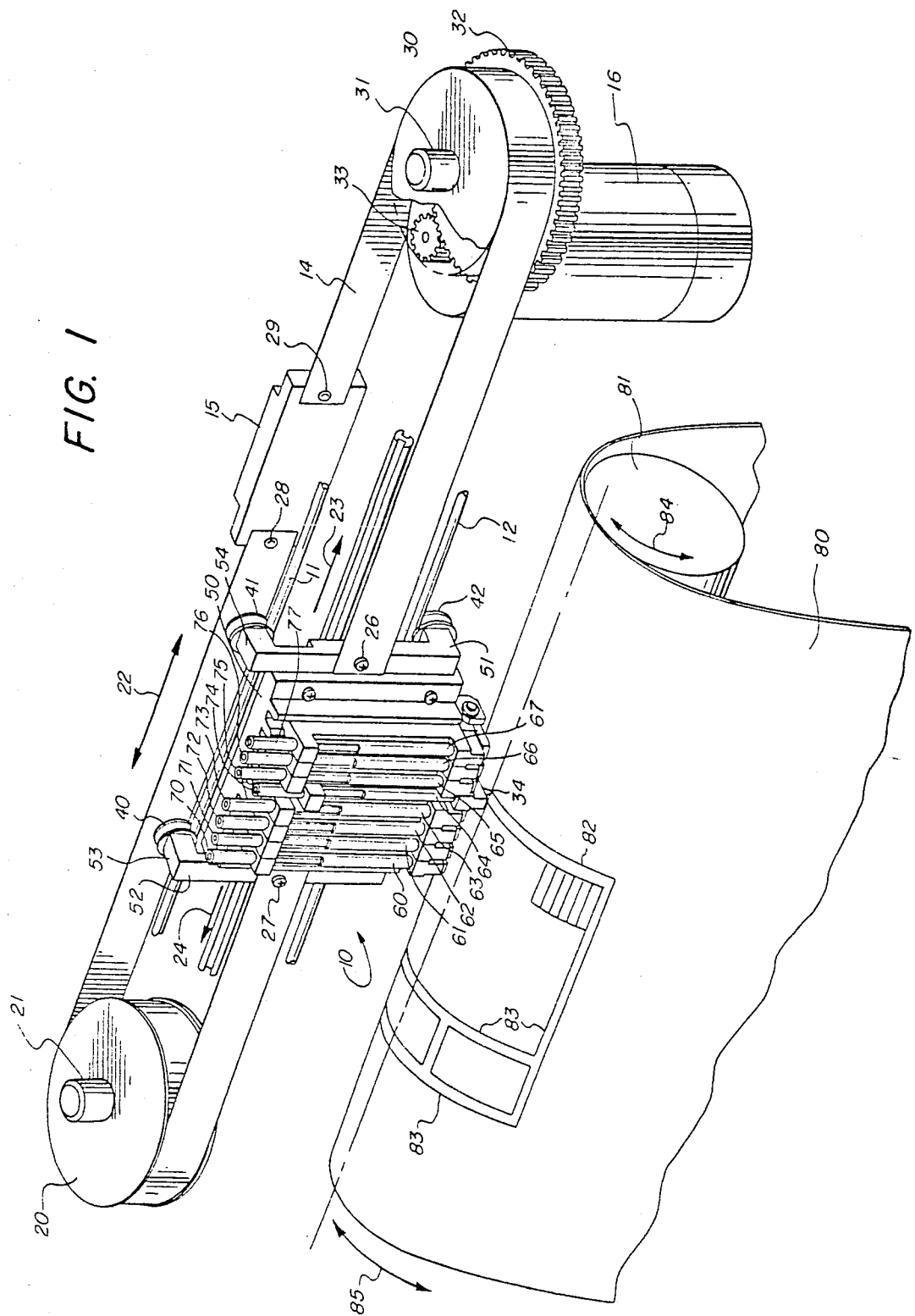
FIG. 1 is a general perspective view of a rotary actuated graphic recording system of the type to which the present invention applies as set forth in the copending application Ser. No. 07/075,533, filed: 07-20-87 for Rotary Action Graphic Recording System.

FIG. 1 sets forth a perspective view of a Rotary Actuated Graphic Recording System the structure of which is set forth in the above-identified copending application in greater detail and which includes the present invention symmetrical braking system. A moveable pen carriage generally referenced by numeral 10 is secured to and controlled by a closed flexible carriage band 14. Carriage band 14 is formed of a generally flat ribbon-like band of stainless steel. An upper track 11 and lower track 12 are supported parallel to the motion path of the forward portion of carriage band 14 by means not shown which provide a substantially rigid construction in which upper track 11 and lower track 12 may support the weight of pen carriage 10.

Pen carriage 10 includes a pen shuttle guide 50 which is formed of a lightweight, rigid plastic material. A pair of generally U-shaped wheel support members, also formed of a lightweight, rigid plastic material 51 and 52, are secured to pen shuttle guide 50. Wheel support 51 terminates at one end in a rearwardly extending axle support 54 and at the other end in a similar axle support 55. Wheel support 52 is identical to wheel support 51 and terminates at one end in a rearwardly extending axle support 53 and a rearwardly extending axle support 56 at the other end (the latter seen in FIG. 3). A quartet of grooved wheels 40, 41, 42, and 43 (better seen in FIG. 3) are rotatably secured to axle supports 53, 54, 55, and 56 respectively. Wheels 40 through 43 are configured to receive and provide a track engagement with upper track 11 and lower track 12. The resulting cooperation of wheels 40 through 43 and tracks 11 and 12 retains pen carriage 10 in a rolling engagement with upper track 10 and lower track 12 such that pen carriage 10 is freely moveable in the directions indicated by arrows 23 and 24.

Pen carriage 10 supports a plurality of generally elongated pen shuttles 70 through 77 which are moveably secured to pen shuttle guide 50 in a linear array. Pen shuttles 70 through 77 are generally perpendicular to the direction of travel of pen carriage 10 and each supports a corresponding one of a plurality of pens 60 through 67 respectively such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 63 and 65 through 67 are supported in their raised position while pen 64 is supported in its downwardly extending position.

As is set forth in the above-identified copending application, a media drive roller 81 is supported by conventional means (not shown) such that its major axis is generally parallel to the travel path of pen carriage 10 and a flexible sheet media 80 is supported by media roller 81 such that rotational motion of media roller 81 in the path indicated by arrows 84 results in a corresponding linear motion of media 80.

A pair of pulleys 20 and 30 are rotatably supported by a pair of pulley supports 21 and 31 respectively. Pulleys 20 and 30 are supported at opposite ends of the travel path of carriage band 14 and the respective ends of carriage band 14 are joined by a pair of fasteners 28 and 29 to an elongated counterweight 15. Thus, carriage band 14 forms a continuous ribbon of material extending from fastener 28 around pulley 20 through pen carriage 10 around drive pulley 30 to fastener 29 and through pen carriage 10. Pulley 20 comprises a free moving idler pulley while drive pulley 30 supports a ring gear 32. A carriage motor 16 which may comprise any of the number of presently available bidirectional electric motors, supports a drive gear 33 which, in accordance with generally accepted principles of graphic recorder construction, is operatively coupled to the armature of carriage motor 16 (not shown) such that energizing carriage motor 16 results in rotating gear 33. Drive pulley 30 is supported with respect to gear 33 such that gear 33 engages gear 32 causing drive pulley 30 to rotate. By means not shown, but in accordance with generally accepted fabrication techniques, carriage band 14 is maintained in tension to provide effective coupling of motion between drive pulley 30 and carriage band 14. As a result, rotational drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10 by means set forth below in greater detail. In accordance with an important aspect of the present invention, actuator beam 13 is operatively coupleable to selected ones of pen shuttles 70 through 77 by a rotary drive 90 (better seen in FIG. 3).

While the operation of the system of FIG. 1 is set forth in greater detail in the above-identified copending application, suffice it to note here that electronic control means constructed in accordance with generally accepted graphic recording system techniques cause motor 16 to drive carriage band 14 and thereby pen carriage 10 back and forth along the travel path indicated by arrows 23 and 24 to produce bidirectional motion of pen carriage 10. Concurrently, the electronic control means are operatively coupled to media roller 81 through conventional fabrication techniques to rotate media roller 81 in either of the directions indicated by arrow 84 and cause a corresponding motion of media 80 in either of the directions indicated by arrow 85. By means set forth below in greater detail and in accordance with an important aspect of the present invention, a selected pen shuttle, such as pen 74, is moved by rotation of actuator beam 13 in a downward direction to bring pen point 34 of pen 64 into contact with media 80. Thereafter, under control of the electronic control means, combinations of pen carriage motion in directions indicated by arrows 23 and 24 together with coordinated motions of media 80 in the directions indicated by arrow 85 result in recording a plurality of line markings 83 upon media 80.

While pens 60 through 67 may comprise recording pens having a variety of pen characteristics, most commonly pens 60 through 67 will be selected to provide different color recording pens. Accordingly, by means set forth below in greater detail, operation of actuator beam 13 and rotary drive 90 cooperate with carefully controlled motion of pen carriage 10 to permit the selective use of the desired one of pens 60 through 67. As mentioned, the operation of the present invention rotary pen actuation is set forth in greater detail in the above-identified copending application. However, suffice it to note here that no electrical power connections are made to pen carriage 10. The selection of the desired one of pens 60 through 67 is achieved entirely by the cooperation of passive elements supported by pen carriage 10 which are driven by stationary powered actuation means.

FIG. 2 sets forth an enlarged and more detailed front perspective view of pen carriage 10. As mentioned above, pen carriage 10 is carried upon upper track 11 and lower track 12 by a quartet of grooved wheels 40 through 43 (the latter seen in FIG. 3). Pen shuttle guide 50 includes a rigid top 182 and rigid base 180 forming the upper end lower sides of the generally rectangular configuration of pen shuttle guide 50. Top 182 and base 180 of pen shuttle guide 50 are joined by a generally planar flange portion 46 on one side and an identical planar flange portion 47 on the other side. In the preferred form, top 182, base 180 and flange portions 46 and 47 are combined in a single molded unit. As is also mentioned above, wheel supports 51 and 52 are identical in construction and are attached to flanges 46 and 47 respectively to couple pen carriage 10 to tracks 11 and 12.

Actuator beam 13 defines a pair of longitudinally extending parallel channels 17 and 18 and an opposed pair of convex surfaces 35 and 36. In addition, actuator beam 13 defines a pair of longitudinally extending flat surfaces 88 and 89 at each side of convex surface 36 and a pair of similar flat surfaces 86 and 87 at each side of convex surface 35. The functional importance of channels 17 and 18, convex surfaces 35 and 36 and flat surfaces 87 through 89 are set forth below in greater detail. However, suffice it to note here that actuator beam 13 comprises an elongated member having a substantially constant cross-section formed in an approximate I-beam shape.

FIG. 3 sets forth a rear persepective view of pen carriage 10 supported upon upper track 11 and lower track 12 by grooved wheels 40 through 43. Pen carriage 10 defines a pen shuttle guide 50 which comprises a generally rectangular frame member and which is secured to wheel supports 51 and 52 in a precise alignment with upper track 11 and lower track 12. By means set forth in the above-identified copending application, pen shuttles 70 through 77 are received within a plurality of pen shuttle channels 120 through 127 respectively and are supported by bearing structures cooperating with angled surfaces of the pen shuttle channels to provide a precise travel path for each of pen shuttles 70 through 77. A plurality of pen shuttle backs 190 through 197, the structures of which are set forth below in greater detail, are secured to pen shuttles 70 through 77 respectively by means of attachment also set forth below in greater detail in an attachment which captivates pen shuttles 70 through 77 in sliding engagement with pen shuttle channels 120 through 127 respectively.

Pen shuttles 70 through 77 are biased to their raised positions shown in FIGS. 2 and 3 by a plurality of coiled springs 170 through 177 (springs 176 and 177 not shown). As a result, pen shuttles 70 through 77 are slideably moveable within pen channels 120 through 127 respectively and are maintained in their topmost positions within channels 120 through 127 by the biasing of springs 170 through 177 respectively. However, springs 170 through 177 are selected to have spring constants which may readily be overcome and which permit pen shuttles 70 through 77 to be moved downwardly to the extended position shown occupied by pen 74 in FIG. 1. This downward position of course corresponds to the extension of the recording pens which permits recording upon the media.

Pen shuttle backs 190 through 197 are of identical construction and define a plurality of elongated apertures 150 through 157 respectively. A plurality of gear racks 110 through 117 comprise generally planar members having a plurality of longitudinally extending parallel gear teeth in a straight line arrangement and are supported within apertures 150 through 157 respectively in a substantially vertical arrangement.

As mentioned above, actuator beam 13 is parallel to upper track 11 and lower track 12 and is spaced from tracks 11 and 12 by a predetermined distance which is constant over the entire travel track of pen carriage 10. Base 180 defines a downwardly extending channel 181 extending its entire length and top 182 defines a similar channel 183 extending upwardly across the entire length of pen shuttle guide 50. A generally planar drive carriage 91 is received within channels 181 and 183 and supported thereby in a precise fit which maintains the vertical position of drive carriage 91 accurately while permitting drive carriage 91 to be readily moved back and forth across pen shuttle guide 50.

A generally planar support flange 92 is joined orthogonally to drive carriage 91. A gear stop 96 comprising a generally cylindrical extension is joined to support flange 92. While not visible in FIG. 3, support flange 92 also defines an aperture through which actuator beam 13 passes. The size of the aperture in support flange 92 is substantially greater than the dimensions of actuator beam 13 thereby permitting actuator beam 13 to pass through support flange 92. A generally planar support 93 is joined to drive carriage 91 and the upper edge of support flange 92 to strengthen the attachment of support flange 92 to drive carriage 91. A rotary drive 90 includes a generally cylindrical housing 100 defining a substantially rectangular center aperture 184 (better seen in FIG. 4) and a irregularly shaped aperture 101. A pair of generally rectangular bearing supports 103 and 104 are joined to and supported by the front surface of drive housing 100 adjacent opposite sides of aperture 184. Bearing support 103 supports an inwardly facing bearing 105 and a pair of transversely facing bearings 99 and 107. Similarly, bearing support 104 supports an inwardly facing bearing 106 and a pair of transversely facing bearings 98 and 108. A curved gear 95 extends outwardly from drive housing 100 and defines a radius of curvature slightly greater than that of drive housing 100. A shaft brake mechanism 102 constructed in accordance with the present invention is supported within drive housing 100 and is set forth below in greater detail.

Drive housing 100 is rotatably supported upon support flange 92 and is rotatable in the counterclockwise direction to a maximum counterclockwise position in which gear 95 abuts gear stop 96. In the fully counterclockwise position, gear 95 assumes the position shown in FIG. 6. As drive housing 100 is rotated from its maximum counterclockwise position, gear 95 moves to a position in which it extends through aperture 94 in drive carriage 91 and into the one of apertures 150 through 157 which are aligned with gear 95. In the position shown in FIG. 3, gear 95 is in alignment with aperture 157 of pen shuttle back 197 and therefore extends through aperture 177 therein. With continued clockwise rotation of drive housing 100, gear 95 engages gear rack 117 of pen shuttle back 197. Thereafter, further clockwise rotation of drive housing 100 causes a downward force to be exerted upon gear rack 117 which in turn overcomes the spring biasing force of spring 177 (not shown) and begins to move pen shuttle 77 in the downward direction. Finally, the clockwise motion of drive housing 100 moves gear rack 117 and pen shuttle 77 in the downward direction until the point of the selected pen contacts the media.

As mentioned above, actuator beam 13 extends through aperture 184 in drive housing 100 and a second aperture (not seen) in flange support 92. As a result, actuator beam 13 extends completely through rotary drive 90 and rotary drive 90 is freely moveable with respect to actuator beam 13. As is also mentioned above, actuator beam 13 defines a general I-beam cross-section in which a pair of opposed longitudinal channels 17 and 18 extend the entire length of the actuator beam and in which convex surfaces 35 and 36 extend outwardly from channels 17 and 18 on opposite ends thereof. A pair of flat surfaces 88 and 89 are defined on either side of convex surface 36 and a corresponding pair of flat surfaces 86 and 87 are defined on either side of convex surface 35. With respect to rotary drive 90, it should be noted that bearing supports 103 and 104 are spaced from and oriented with respect to actuator beam 13 and aperture 184 such that inwardly facing bearings 105 and 106 are received within channels 17 and 18 respectively and transverse bearings 98, 99, 107 and 108 engage flat surfaces 86 and 87 respectively. The extension of bearings 105 and 106 into channels 17 and 18 provides a coupling engagement between actuator beam 13 and drive housing 100 in which rotational motion of actuator beam 13 causes a corresponding rotational motion of drive housing 100. As a result, the cooperation of bearings 98, 99, 105, 106, 107 and 108 of rotary drive 90 and channels 17 and 18 of actuator beam 13 facilitates a rotary motion coupling between drive housing 100 and actuator beam 13 without restricting the free movement of rotary drive 90 along the length of actuator beam 13.

As mentioned above, housing 100 supports an internal brake mechanism 102, which is constructed in accordance with the present invention and which is set forth below in greater detail. However, it is believed that detailed descriptions of the present invention symmetrical braking system are better understood if undertaken after an understanding of the pen changing operation is gained. Accordingly, it is sufficient to understand at this point that brake mechanism 102 closes grasping beam 13 in response to counterclockwise rotation of actuator beam 13 and opens releasing beam 13 with clockwise rotation. That is to say, as gear 95 is rotated into a position nearing abutment with gear stop 96, brake mechanism 102 engages convex surfaces 35 and 36 of beam 13 to secure rotary drive 90 to actuator beam 13. Conversely, the securing or closure of brake 102 to convex surfaces 35 and 36 is released when actuator beam 13 is rotated in the clockwise direction from its maximum counterclockwise position.

With this initial understanding of the present invention braking system, the pen changing operation will be discussed. As mentioned, pen carriage 10 is moveable, as described above, upon tracks 11 and 12 in the directions indicated by arrows 23 and 24 in response to motion of carriage band 14 through the above-described actions of carriage motor 16, drive pulley 30 and gears 32 and 33. Because drive carriage 91 is freely moveable with respect to pen carriage 10 within channels 181 and 183 of pen shuttle guide 50, rotation of actuator beam 13 to its maximum counterclockwise position (seen in FIG. 6) causes the present invention brake 102 to grasp convex surfaces 35 and 36 of actuator beam 13 and maintain the position of rotary drive 90 with respect to actuator beam 13 notwithstanding motion of pen carriage 10. Accordingly, with actuator beam 13 rotated to its maximum counterclockwise position and rotary drive 90 secured to actuator beam 13, motion of pen carriage 10 produces a relative motion between rotary drive 90 and pen carriage 10. Because pens 60 through 67 are arranged in a linear array selection of a desired one of pens 60 through 67 for recording use is then accomplished by moving pen carriage 10 until gear 95 of rotary drive 90 is aligned with the aperture in the pen carriage back corresponding to the selected pen.

If for example it is desired to select pen 63 with the relative positions of pen carriage 10 and rotary drive 90 being those shown in FIG. 3, actuator beam 13 is rotated counterclockwise to lock rotary drive 90 to actuator beam 13. Next, pen carriage 10 is moved in the direction indicated by arrow 24 until gear 95 is aligned with aperture 153 in pen shuttle back 193. Thereafter, pen carriage 10 is momentarily stopped while actuator beam 13 is rotated in the clockwise direction indicated by arrow 128 which simultaneously releases brake 102 and moves gear 95 into aperture 153. Once brake 102 is released and gear 95 extends into aperture 153 of pen shuttle back 193, motion of pen carriage 10 in either of the directions indicated by arrows 23 or 24 may be resumed. At this point, gear 95 assumes the position shown in FIG. 4 which corresponds to the "rest position" of the actuator system. In the rest position, pen 63 has not yet been moved down to facilitate contact with the media. However, at this point the pen changing function is complete and rotary drive 90 is carried by motion of pen carriage 10 due to the extension of gear 95 into aperture 153.

Once pen carriage 10 has reached the position over the media at which it is desired to begin recording upon the media, actuator beam 13 is further rotated in the clockwise direction indicated by arrow 128 causing gear 95 to engage rack 113 and drive pen shuttle 73 and thereby pen 63 downward until contact with the media is established. With contact established with the media by pen 63, the motions of pen carriage 10 and the media set forth in descriptions accompanying FIG. 1 is undertaken to carry out the plotting operation.

Thus, pen selection may be summarized as (1) securing rotary drive 90 at a fixed position with respect to actuator beam 13 by full counterclockwise rotation of actuator beam 13 (2) moving carriage 10 until the appropriate pen is aligned and (3) rotating actuator beam 13 and rotary drive 90 to release brake 102 and engage pen carriage 10 at the point corresponding to the selected pen. It should be noted that rotary drive 90 continues to be carried by pen carriage 10 in either the rest position or the recording position. As a result, vertical pen movement in and out of contact with the media necessary to undertake the above-described plotting operation, simply requires rotation of actuator beam 13 to raise and lower the operative pen.

Figure 4:
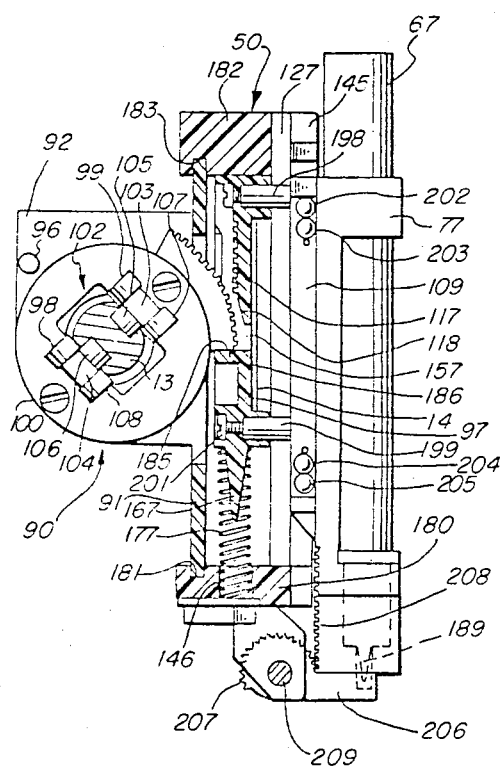
FIG. 4 is a section view of the Rotary Actuated Graphic Recording System taken along Section lines 4—4 in FIG. 2 depicting the rotary actuator in a non-engaged position.
Figure 5:
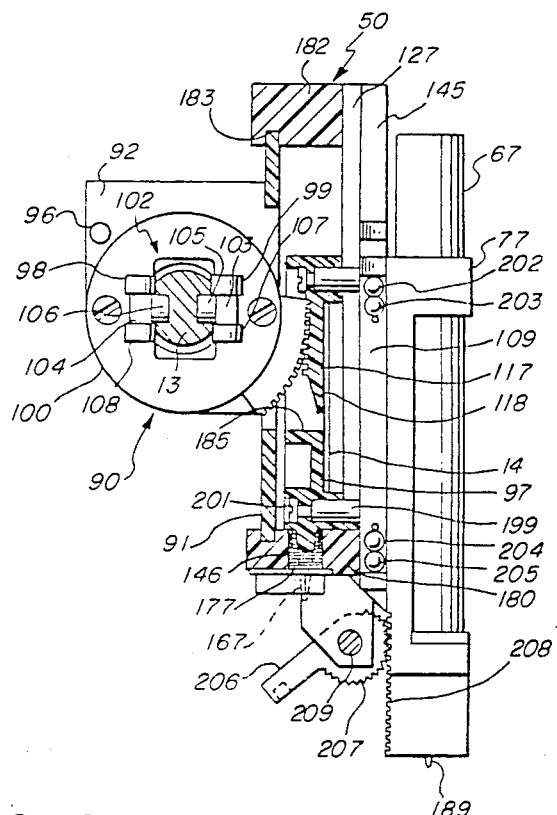
FIG. 5 is a section view of the Rotary Actuated Graphic Recording System taken along Section lines 4—4 in FIG. 2 depicting the rotary actuator in the recording position.
Figure 6:
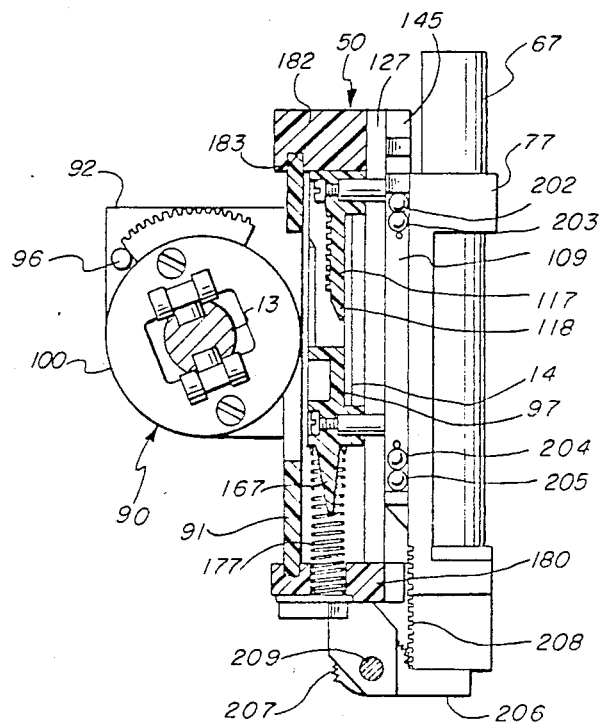
FIG. 6 is a section view of the Rotary Actuated Graphic Recording System taken along Section lines 4—4 in FIG. 2 during recording pen change.

FIGS. 4, 5 and 6 set forth partially sectioned views of pen carriage 10 and rotary drive 90 and depict different positions of rotary drive 90 and the action of brake 102. FIG. 4 sets forth the rotary actuator in its rest position in which a selected pen has been engaged but is not moved into the recording position. FIG. 5 sets forth the rotary actuator with the selected pen in the write or record position. FIG. 6 sets forth rotary drive 90 completely disengaged from pen carriage 10 with brake 102 engaging actuator beam 13.

With respect to FIG. 4, pen shuttle guide 50 defines a top 182 having an upwardly extending channel 183 and a base 180 having a downwardly extending channel 181. Pen shuttle guide 50 defines a pen channel 127, the structure of which is set forth above. Pen shuttle 77 supports pen 60 in a vertical position and defines a pair of inwardly extending generally cylindrical bosses 198 and 199. Pen shuttle 77 further supports a plurality of ball bearings 202, 203, 204 and 205 as well as an additional similar plurality of the ball bearings (not seen) on the other side of rib 109. The function of ball bearings associated with rib 109 of pen shuttle 77 is to provide a suitable rolling bearing for sliding contact with angled surfaces 144 and 145 of pen shuttle channel 127. Bosses 198 and 199 are received within pen shuttle back 197 and secured thereto by a pair of threaded fasteners 200 and 201. As mentioned, pen shuttle back 197 defines an aperture 157 within which gear rack 117 is supported. Gear rack 117 defines a generally tapered surface 118. A generally flat edge 185 forms the bottom surface of aperture 157. Pen shuttle back 197 further defines a generally conical, downwardly extending spring guide 167. Base 180 further defines a recess 146. A coiled spring 177 is compressively supported at one end within recess 146 and at the other end by its encircling of spring guide 167. Actuator beam 13 extends through aperture 184 in rotary drive housing 100 and is engaged by bearings 105 through 108 as described above. Drive housing 100 is supported by support flange 92 and gear 95 extends outwardly from drive housing 100.

Brake 102 includes a pair of brake shoes 210 and 211 supported by means set forth below in greater detail on either side of actuator beam 13. However, it should be noted that in the position shown in FIG. 4, in which rotary drive 90 is in the rest position, gear 95 extends into aperture 157 of pen shuttle back 197 and brake shoes 210 and 211 are positioned away from actuator beam 13. As a result, brake 102 is disengaged, and as described above, rotary drive 90 is freely moveable with respect to actuator beam 13 and pen 67 is removed from contact with the media. Because gear 95 is in contact with lower edge 185 of aperture 157, rotary drive 90 is carried by the motion of pen carriage 10.

FIG. 5 is identical to FIG. 4 with the exception that pen 67 has been moved to the recording position in which drive housing 100 is rotated farther in the clockwise direction causing gear 95 and rack 117 to cooperate to drive pen shuttle 77 downward until pen 67 contacts the media. It should be noted that in the position shown in FIG. 5, brake shoes 210 and 211 of brake 102 are once again out of contact with actuator beam 13 and rotary drive 90 is released from engagement with actuator beam 13. This permits the above-described motion of the combination of rotary drive 90 and pen carriage 10 as pen 67 is used to record upon the media.

FIG. 6 shows actuator beam 13 and thereby drive housing 100 maximally rotated in the counterclockwise direction. As a result, rotary drive 90 is completely disengaged from pen shuttle 77 and gear 95 contacts gear stop 96. In this position, brake 102 engages actuator beam 13 causing rotary drive 90 to remain in a fixed position upon actuator beam 13 and facilitating pen change.

FIG. 7 sets forth a perspective view of rotary drive 90 situated upon actuator beam 13. A rectangular carriage drive 91 defines a rectangular aperture 94 and an outwardly extending support flange 92. A support 93 is joined to support flange 92 and a portion of carriage drive 91. Support flange 92 is generally perpendicular to carriage drive 91 and is or strengthened by support 93. A generally cylindrical gear stop 96 extends outwardly from support flange 92. Rotary drive 90 further includes a cylindrical housing 100 which as is set forth below, is formed of a brake rotor 240 and a front plate 220. A generally rectangular notch 242 and a second rectangular notch 221 are formed in housing 100. A gear portion 95 extends outwardly from brake rotor 240. Front plate 220 is secured to brake rotor 240 by a pair of fasteners 237 and 238. Front plate 220 defines a rectangular aperture 184 and a pair of outwardly extending bearing supports 103 and 104. Bearing support 103 supports an inwardly extending bearing 105 and a pair of transverse bearings 107 and 99. Similarly, bearing support 104 supports an inwardly extending bearing 106 and pair of transversely extending bearings 98 and 108. A pair of brake shoes 210 and 211 are supported, by means set forth below, within the interior of brake rotor 240 and are seen through notch 242 therein. A cylindrical bearing 250 is supported, by means set forth below, upon brake shoe 211 and is captivated within notch 221. As will be seen by reference to FIG. 8, actuator beam 13 extends through the entire structure of rotary drive 90 passing through aperture 184 of front plate 220, apertures 266 and 261 of brake shoes 210 and 211 respectively, aperture 247 of brake rotor 240, inner race 234 of bearing 233, and center passage 224 of brake support 222.

Returning to FIG. 7, in accordance with the operation set forth above, it will be recalled that actuator beam 13 defines a pair of channels 17 and 18 extending its entire length and that bearing 105 extends into and is received within channel 17 add bearing 106 extends into and is received within channel 18. In accordance with the above-described operation of rotary drive 90, the cooperation of bearings 105 and 106 and channels 17 and 18 provides a coupling for rotational forces between actuator beam 13 and rotary drive 90. Because bearings 105 and 106 are freely rotatable about their respective supports and provide a rolling action, rotary drive 90 is freely moveable upon actuator beam 13. In addition as is also described above, beam 13 defines a pair of flat surfaces 86 and 89 adjacent channel 17 and a pair of flat surfaces 87 and 88 adjacent channel 18. Bearings 107 and 99 ride upon flat surfaces 86 and 89 respectively and bearings 108 and 98 roll upon flat surfaces 87 and 88 respectively. The cooperation of bearings 107, 108, 99, 98 upon surfaces 86 through 89 further supports drive 90 with respect to actuator beam 13 and enhances the free motion drive 90 with respect to actuator beam 13.

FIG. 8 sets forth a perspective exploded view of rotary drive 90. Support flange 92 of carriage drive 91 supports a generally cylindrical brake support 222 which defines an outwardly extending rim 223 and a cylindrical surface 236. Brake support 222 further defines a center passage 224 which should be understood to extend entirely through brake support 222 and support flange 92. Brake support 222 further defines a cam surface 225, a rise 227, and a cam surface 226 and a similar arrangement of cam surfaces comprising a cam surface 230, a rise 232, and a cam surface 231. For reasons set forth below in greater detail, cam surfaces 231 and 226 are positioned on opposite sides of center passage 224 and define curved surfaces of constant radius concentric with cylindrical surface 236. In contrast, for reasons set forth below, cam surfaces 225 and 230 are positioned on opposite sides of center passage 224 but define surfaces which extend outwardly from rises 227 and 232 respectively. A generally cylindrical bearing 233 constructed in accordance with conventional bearing techniques defines an outer race 235 and an inner race 234. By means not shown but which in their preferred form comprise a conventional roller bearing structure, inner race 234 is freely moveable with respect to outer race 235. A brake rotor 240 defines a generally cylindrical member having a outwardly extending gear portion 95 and a pair of notches 242 and 221. Brake rotor 240 further defines a similar pair of notches 243 and 244 and a center passage 247. Center passage 247 in turn defines a cylindrical recess 245. Recess 245 is sized to receive outer race 235 of bearing 233 in a secure interference fit. Brake rotor 240 further defines a pair of threaded apertures 270 and 271.

Brake shoe 211 defines a generally planar structure having a center aperture 261 and an outwardly extending notch 260. Brake shoe 211 further defines a brake surface 263 adjacent aperture 261 and a pair of oppositely extending pins 262 and 251. A similar brake shoe 210 defines a generally planar structure having a center aperture 266 and a generally curved slot 265. A spring member 264 extends about a portion of slot 265. Brake shoe 210 further defines a cylindrical extension 253 which terminates in a cylindrical pin 252. A pair of conventional cylindrical roller bearings 250 and 246 are received upon and supported by pins 251 and 252 respectively. As will be described below, bearings 250 and 246 function as cam followers for the braking system. A front plate 220 defines a rectangular aperture 284 and a pair of outwardly extending bearing supports 103 and 104. As described above, bearing support 103 supports bearings 99, 107, and 105 while bearing support 104 supports bearings 98, 106, and 108. Front plate 220 further defines a pair of opposed apertures 272 and 273.

Rotary drive 90 is assembled by placing bearing 233 upon brake support 222 such that inner race 234 is securely received by and supported upon cylindrical surface 236 abutting rim 223. Thereafter, brake rotor 240 is assembled to outer race 235 of bearing 233 within recess 245 of brake rotor 240. It should be noted that the fit between inner race 234 and cylindrical surface 236 as well as the fit between outer race 235 and recess 245 are interference or force-fits resulting in a secure attachment. Examining the structure resulting at this point in assembly it will be apparent that the operation of bearing 233 supports brake rotor 240 in a freely rotatable attachment. Brake shoe 211 having bearing 250 assembled to pin 251 is then placed within notches 242 and 243 of brake rotor 240. It should be noted that brake shoe 211 is shaped to be received within and captivated by notches 242 and 243 such that brake shoe 211 is not rotatable with respect to brake rotor 240. It should also be noted that with brake shoe 211 assembled within notches 242 and 243, bearing 250 extends into notch 221. With brake shoe 211 thus assembled, bearing 250 overlies and rests upon cam surface 225 of bearing support 222. Similarly, brake shoe 210 having bearing 246 assembled to pin 252 is received within notches 242 and 243. When so positioned brake shoe 210 is also confined as to rotational motion by notches 242 and 243. In further similarity, bearing 246 overlies and rests upon cam surface 230 of bearing support 222. At this point, it should be noted that while brake shoes 210 and 211 are confined within notches 242 and 243 of brake rotor 240 as to rotational motion, they remain free to move radially outward or inward with respect to brake rotor 240 and with respect to each other.

Finally, front plate 220 having bearings 98, 99, 105, 106, 107, 108 assembled to bearing supports 103 and 104 is placed upon surface 241 of brake rotor 240 such that apertures 272 and 273 of front plate 220 are aligned with apertures 270 and 271 of brake rotor 240. A pair of fasteners 238 and 237 (seen in FIG. 7) extend through apertures 272 and 273 respectively and are threadably received within apertures 270 and 271 respectively to secure front plate 220 to surface 241 and captivate brake shoes 210 and 211 within notches 242 and 243. With the foregoing assembly complete, rotary drive 90 assumes the configuration shown in FIG. 7.

Figure 9A:
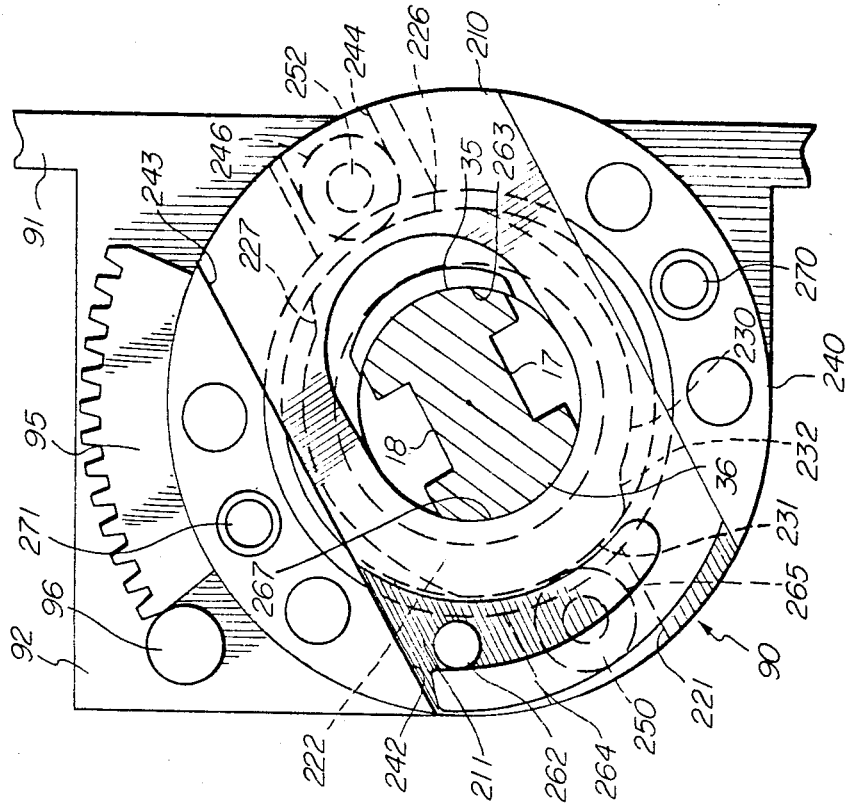
FIGS. 9A and 9B are section views of the present invention symmetrical brake in the open and closed positions respectively taken along section lines 9—9 in FIG. 7.
Figure 9B:
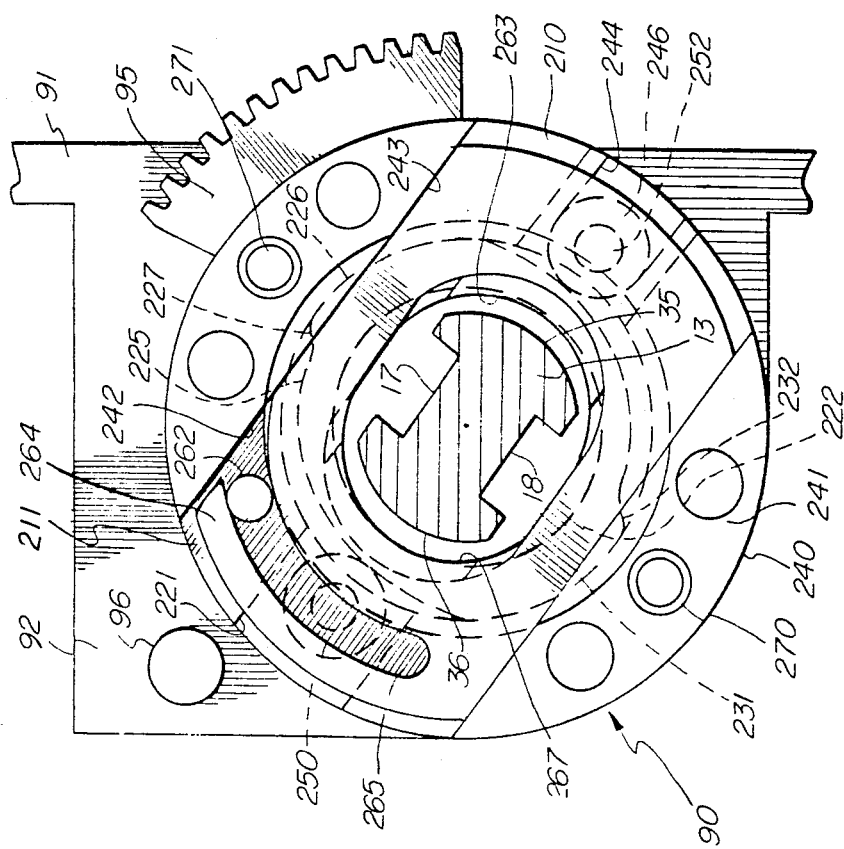

FIGS. 9A and 9B set forth a pair of sectioned views of rotary drive 90 taken along section lines 9—9 in FIG. 7. It should be noted that FIGS. 9A and 9B are substantially identical with the exception of the rotational position of brake rotor 240. FIG. 9A shows brake rotor 240 rotated in the clockwise direction such that the present invention symmetrical braking system assumes a released position while FIG. 9B shows the present invention braking system grasping actuator beam 13. In both FIGS. 9A and 9B the section views are taken along section lines 9—9 in FIG. 7 to result in viewing rotary drive 90 as it appears with front plate 220 and fasteners 237 and 238 removed.

With specific reference to FIG. 9A, in which rotary drive 90 is rotated in the clockwise direction and the braking system of the present invention is released, rotor 240 is supported upon brake support 222 by bearing 233 in accordance with the assembly shown in FIGS. 7 and 8. As described above, brake shoes 210 and 211 are supported within notches 242 and 243 of brake rotor 240 such that brake shoe 211 is positioned beneath brake shoe 210. As is also described above, brake shoe 211 defines an upwardly extending pin 262 which in the assembled position shown extends into slot 265 defined in brake shoe 210 and contacts spring 264 of brake shoe 210. As is also describe above, brake shoe 211 defines an inwardly extending pin 251 which supports a bearing 250. Similarly, brake shoe 210 defines an inwardly extending pin 252 which supports a bearing 246. As mentioned, bearings 250 and 246 are conventional roller type bearings providing a rotating bearing structure freely rotatable about pins 251 and 252. In addition, bearing 250 is received within notch 221 of brake rotor 240 and bearing 246 is received within notch 244 of brake rotor 240. Actuator beam 213 extends through the structure of rotary drive 90 in accordance with the description set forth above in FIGS. 7 and 8. Brake shoe 211 defines a brake surface 263 while brake shoe 210 defines a brake surface 267. In the assembly shown, brake surfaces 267 and 263 are supported on opposite sides of actuator beam 13 with brake surface 267 proximate convex surface 36 and brake surface 263 proximate convex surface 35. At this point it should be recalled that bearings 105 and 106 supported on front plate 220 (see FIG. 8), extend into channels 17 and 18 of actuator beam 13 respectively and maintain the relative rotational positions between actuator beam 13 and brake surfaces 263 and 267 during rotation of beam 13.

The arrangement of cam surfaces on brake support 222 described above is seen in dashed line representation due to overlying brake shoes 210 and 211. A pair of opposed cam surfaces 225 and 230 and a second pair of cam surfaces 231 and 226 surround actuator beam 13. Cam surfaces 231 and 230 are separated by a rise 232 while cam surfaces 225 and 226 are separated by a rise 227. As mentioned above, cam surfaces 226 and 231 are of a constant radius and are concentric with respect to cylindrical surface 236 while cam surfaces 225 and 230 curve outwardly from rises 227 and 232 respectively to join cam surfaces 231 and 226 respectively. In other words, the distance between cam surfaces 231 and 226 is constant over the entire cam surfaces while the distance between cam surfaces 225 and 230 is a minimum at the portions of the cam surfaces closest to rises 237 and 232 and increases to a maximum distance at the transitions of cam surfaces 225 and 230 to cam surfaces 231 and 226 respectively.

In the position shown in FIG. 9A, bearings 250 and 252 are resting upon cam surfaces 225 and 230 respectively. As a result, brake shoes 211 and 210 are positioned within brake rotor 230 such that brake surfaces 263 and 267 are spaced from convex surfaces 35 and 36 respectively. It should also be noted that pin 262 and spring 264 cooperate in the position shown in FIG. 9A to provide a biasing force between brake shoes 210 and 211 which urges them inwardly, that is, brake shoe 211 to the left and brake shoe 210 to the right. In accordance with an important aspect of the present invention, the force of spring 264 is applied solely to pin 262 of brake shoe 211. As a result, the biasing force produced is operative solely between brake shoes 210 and 211 and is not imparted to the remainder of the brake or rotary drive structure.

With simultaneous reference to FIGS. 9A and 9B and comparison therebetween, it should be noted that FIG. 9b depicts the relative position of the components within rotary drive 90 which results when brake rotor 240 is rotated to a counterclockwise position. As will be apparent, the counterclockwise rotation of brake rotor 240 causes bearing 250 to be rolled across cam surface 225 and to an outwardly displaced position upon cam surface 231. Similarly, the counterclockwise rotation of brake rotor 240 moves bearing 246 across cam surface 230 driving it outwardly and rolling it upon cam surface 226. The outward force applied to bearing 250 by cam surfaces 225 and 231 results in driving brake shoe 211 outwardly (to the left) which in turn pulls brake surface 263 against convex surface 35 of actuator beam 13. Similarly, the outward force coupled to bearing 246 drives brake shoe 210 outwardly (to the right) which in turn pulls braking surface 267 against convex surface 236 of actuator beam 13. The spacing between cam surfaces 231 and 226 is selected to provide the desired braking force upon surfaces 35 and 36 of actuator beam 13.

In addition, the outward motions of brake shoes 210 and 211 with respect to actuator beam 13 cause pin 262 to deflect spring 264. The force created between pin 262 and spring 264 urges brake shoes 210 and 211 inwardly toward the position shown in FIG. 9A. However, so long as bearings 250 and 246 rest upon cam surfaces 231 and 226 respectively, this spring force is overcome and brake surfaces 263 and 267 are securely forced against surfaces 35 and 36 of actuator beam 13. In accordance with an important aspect of the present invention, it should be noted that because of the constant radius of curvature and distance between cam surfaces 231 and 226, the braking force applied to actuator beam 13 is symmetrical and is maintained without the need of any continued torque between actuator beam 13 and rotary drive 90. In other words, once bearings 250 and 246 are positioned upon cam surfaces 231 and 226 respectively, no further forces need be applied to the brake mechanism to maintain the secure clamping upon actuator beam 13. As a result, once the present invention braking system is engaged as shown in FIG. 9B, no rotational torque or force component is imparted to carriage drive 91 due to the symmetrical structure of the braking system.

The absence of rotational torque component against carriage drive 91 is extremely advantageous in the operating environment of the system. With temporary reference to FIG. 1, it will be recalled that the present invention braking system is utilized to secure rotary drive 90 to actuator beam 13 during the pen changing operation which is accomplished by moving pen carriage 10 with respect to rotary drive 90 until gear 95 is aligned with the pen shuttle of the desired pen. It is advantageous in accomplishing the above-described pen changing operation that pen carriage 10 be freely moveable with respect to carriage drive 91 during the pen changing interval. Any rotational force (axial or radial) coupled to carriage drive 91 would impart a corresponding force to pen carriage 10 inhibiting the free movement of rotary drive 90 with respect to the pen carriage.

Returning to FIGS. 9A and 9B, it should be noted further that in the maximum counterclockwise position shown in FIG. 9B, gear 95 is spaced from gear stop 96 by a predetermined spacing. In accordance with the foregoing object of the invention of avoiding imparting rotational torque to carriage drive 91, the relative positions of cam surfaces 231 and 226 and gear stop 96 are selected to maintain this spacing. As a result, gear 95 does not contact gear stop 96 in the braking position further avoiding coupling a torque between gear 95 and gear stop 96.

Once the above-described pen selection is accomplished, actuator beam 13 is rotated in the clockwise direction moving bearings 246 and 250 across cam surfaces 226 and 231 respectively to return to cam surfaces 230 and 225 respectively which in turn removes the braking force driving brake shoes 210 and 211 outwardly. With the removal of the braking force, the force of spring 264 against pin 262 pulls brake shoes 210 and 211 inwardly moving brake surfaces 263 and 267 away from surfaces 35 and 36 respectively of actuator beam 13. As a result, the braking system releases actuator beam 13 and rotary drive 90 is again free of any engagement to actuator beam 13.

What has been shown is a lightweight symmetrical braking system for use in a graphic recorder which avoids the need of powered brake mechanisms upon the moveable carriage and which provides a firm braking force without imposing any residual torque to the remainder of the system.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a graphic recorder having a pen carriage moved along a carriage path, an actuator beam positioned proximate the carriage path, and a rotary drive supported by the pen carriage having a center passage receiving the actuator beam therethrough, symmetrical brake means comprising:
   a brake support formed within said rotary drive and defining a support center passage and a cam surface;
   a brake rotor defining a transverse channel and a rotor center passage;
   bearing means rotatably supporting said brake rotor upon said brake support;
   a first brake shoe supported by said brake rotor and defining a first center passage, a first brake surface and a first cam follower;
   a second brake shoe supported by said brake rotor and defining a second center passage, a second brake surface and a second cam follower; and
   rotation means rotationally coupling said brake rotor to said actuator beam such that said brake rotor and said first and second brake shoes are rotated with respect to said brake support during rotation of said actuator beam;
   said first and second cam followers and said cam surface cooperating to move said first and second brake surfaces into engagement with said actuator beam during rotation of said brake rotor in a first direction and out of engagement during rotation of said brake rotor in a second direction.

2. Symmetrical brake means as set forth in claim 1 wherein said first and second brake shoes are positioned within said transverse channel of said brake rotor such that said first and second center passages thereof are generally aligned with said rotor center passage.

3. Symmetrical brake means as set forth in claim 2 wherein said first and second brake surfaces are formed in portions of said first and second center passages and are positioned on opposite sides of said actuator beam and wherein said first and second cam followers and said cam surface cooperate to drive said first and second brake shoes outwardly with respect to said actuator beam and grasp said actuator beam during rotation in said first direction.

4. Symmetrical brake means as set forth in claim 3 further including bias means urging said first and second brake shoes inwardly during rotation of said actuator beam between said first and second brake surfaces in said second direction.

5. Symmetrical brake means as set forth in claim 4 wherein said cam surface defines a first pair of opposed cam surfaces each having a constant radius of curvature and a second pair of opposed cam surfaces each having an outwardly extending curvature and wherein said first and second cam followers comprise roller bearings supported by said first and second brake shoes respectively on opposite sides of said actuator beam and rolling upon said cam surfaces.

6. Symmetrical brake means as set forth in claim 5 wherein said actuator beam defines a pair of opposed convex surfaces and a pair of opposed inwardly extending channels and wherein said rotation means define a generally planar member, having a center aperture, supported upon said brake rotor overlying said first and second brake shoes and having a pair of inwardly extending roller bearings received within said pair of opposed channels and cooperating therewith to couple rotational forces between said actuator beam and said brake rotor.

7. For use in a rotary drive coupling system operated by an elongated actuator beam, symmetrical brake means for engaging said actuator beam in a first rotational position and releasing said actuator beam in a second rotational position, said symmetrical brake means comprising:
   a cylindrical support having a cylindrical surface, a cam surface and a center passage;
   a drive rotor defining a transverse channel and a center passage;
   bearing means having an inner race receiving said cylindrical surface and an outer race supporting said drive rotor;
   a generally planar first brake shoe having a first center aperture, a first brake surface extending about a portion of said first center aperture and a first cam follower, said first brake shoe being received within said transverse channel such that said first cam follower contacts said cam surface and said first center aperture encircles said actuator beam and said first brake surface overlies a portion of said actuator beam;
   a generally planar second brake shoe having a second center aperture, a second brake surface extending about a portion of said second center aperture and a second cam follower, said second brake shoe being received within said transverse channel overlying said first brake shoe and positioned such that said second cam follower contacts said cam surface at a point diametrically opposite to the contact point of said first cam follower, and said second center aperture encircles said actuator beam, and said second brake surface overlies a portion of said actuator beam diametrically opposed to that of said first brake surface; and
   rotational coupling means supported by said drive rotor and having means for coupling rotational forces between said actuator beam and said drive rotor;
   said first and second cam followers and said cam surface cooperating to drive said first and second brake shoes outwardly within said transverse channel and engage said first and second brake surfaces against opposite sides of said actuator beam in said first rotational position.

8. Symmetrical brake means as set forth in claim 7 wherein said cam surface defines a pair of diametrically opposed cylindrical cam surfaces corresponding to said first rotational position and a second pair of cam surfaces extending inwardly from said first pair of surfaces to said second rotational position.

9. Symmetrical brake means as set forth in claim 8 wherein said first brake shoe defines a spring member and said second brake shoe defines a pin member, said spring member and said pin member cooperating to urge said first and second brake shoes inwardly.

10. For use in a rotary drive system operated by rotation of an elongated actuator beam, symmetrical brake means comprising:
   a brake rotor rotationally coupled to said actuator beam;
   a pair of brake shoes moveable along a common axis of motion, each defining a center aperture encircling said actuator beam and an inwardly facing brake surface within said center aperture; and camming means coupled to said pair of brake shoes and said brake rotor operative to apply symmetrical outward forces to said pair of brake shoes drawing said brake surfaces inwardly against opposite sides of said actuator beam in a first rotational position and releasing said symmetrical outward forces in a second rotational position, said brake rotor, said brake shoes and said actuator beam remaining rotationally coupled in said first and second rotational positions.

11. Symmetrical brake means as set forth in claim 10 wherein said symmetrical outward forces applied by said camming means are aligned along said common axis of motion.

12. Symmetrical brake means as set forth in claim 11 wherein said camming means maintain said symmetrical outward forces in said first rotational position in the absence of rotational force by said actuator beam.

13. Symmetrical brake means as set forth in claim 11 wherein said camming means maintain said symmetrical outward forces in said first rotational position without imposing any rotational force upon said actuator beam or said rotary drive system.

14. Symmetrical brake means as set forth in claim 12 further including spring means coupled between said brake shoes in said pair of brake shoes urging said brake shoes inwardly.

15. Symmetrical brake means as set forth in claim 13 further including spring means coupled between said brake shoes in said pair of brake shoes urging said brake shoes inwardly.

* * * * *